(12) United States Patent
Morin et al.

(10) Patent No.: US 7,273,648 B2
(45) Date of Patent: Sep. 25, 2007

(54) COMBINATION LOOP TEXTILE

(75) Inventors: Brian G. Morin, Greer, SC (US); Michael P. Sasser, Cowpens, SC (US); Heather J. Hayes, Chesnee, SC (US)

(73) Assignee: Milliken & Company, Spartanburg, SC (US)

( * ) Notice: Subject to any disclaimer, the term of this patent is extended or adjusted under 35 U.S.C. 154(b) by 246 days.

(21) Appl. No.: 10/714,994

(22) Filed: Nov. 17, 2003

(65) Prior Publication Data
US 2004/0102119 A1 May 27, 2004

Related U.S. Application Data

(63) Continuation of application No. 09/751,998, filed on Dec. 29, 2000, now abandoned.

(51) Int. Cl.
*B32B 33/00* (2006.01)
*B32B 3/02* (2006.01)

(52) U.S. Cl. .............................. 428/89; 428/88; 428/92; 428/97

(58) Field of Classification Search .................. 428/89, 428/88, 92, 97
See application file for complete search history.

(56) References Cited

U.S. PATENT DOCUMENTS

| 3,078,543 | A | * | 2/1963 | Godfrey | 428/92 |
| 3,332,828 | A | * | 7/1967 | Faria et al. | 428/17 |
| 3,617,413 | A | * | 11/1971 | Elbert | 156/61 |
| 3,850,783 | A | * | 11/1974 | Peters et al. | 428/89 |
| 4,045,605 | A | * | 8/1977 | Breens et al. | 428/88 |
| 4,437,269 | A |  | 3/1984 | Shaw | 51/358 |
| 4,576,848 | A | * | 3/1986 | Dillon et al. | 428/89 |
| 4,606,154 | A |  | 8/1986 | Herrmann et al. | 51/401 |
| 4,820,566 | A | * | 4/1989 | Heine et al. | 428/88 |
| 4,893,439 | A |  | 1/1990 | McAvoy et al. | 51/400 |
| 4,966,609 | A |  | 10/1990 | Callinan et al. | 51/295 |
| 5,055,333 | A | * | 10/1991 | Heine et al. | 428/88 |
| 5,075,917 | A | * | 12/1991 | Wheat et al. | 15/161 |
| 5,290,269 | A |  | 3/1994 | Heiman | 604/378 |

(Continued)

FOREIGN PATENT DOCUMENTS

GB          1527622 A    * 10/1978

(Continued)

OTHER PUBLICATIONS

Complete Textile Glossary, 2001, Celanese Acetate LLC, definitions of "coarse thread" and "stiffness."*

(Continued)

*Primary Examiner*—Cheryl A. Juska
(74) *Attorney, Agent, or Firm*—Terry T. Moyer; Cheryl J. Brickey

(57) ABSTRACT

A base substrate having a first side and a second side, first and second receiving loops extending from the first and second side of the base substrate, respectively, and first and second stiff loops extending from the first and second side of the base substrate, respectively. The base substrate is a flexible cloth or cloth-like material. The receiving loops are an absorbent material such as the material used in the base substrate. The stiff loops are formed of a yarn having at least one filament with a cross-section having an aspect ratio of greater than about 1.2, a corner edge, and/or at least a concave portion.

8 Claims, 3 Drawing Sheets

U.S. PATENT DOCUMENTS

| | | | |
|---|---|---|---|
| 5,344,688 A | 9/1994 | Peterson et al. | 428/102 |
| 5,449,530 A | 9/1995 | Peake, III et al. | 427/244 |
| 5,490,878 A | 2/1996 | Peterson et al. | 51/295 |
| 5,525,393 A * | 6/1996 | Raab | 428/89 |
| 5,565,011 A | 10/1996 | Follett et al. | 51/297 |
| 5,615,460 A | 4/1997 | Weirich et al. | 24/446 |
| 5,652,038 A * | 7/1997 | Geren | 428/92 |
| 5,733,825 A | 3/1998 | Martin et al. | 442/361 |
| 5,804,274 A * | 9/1998 | Nordin | 428/89 |
| 5,811,186 A | 9/1998 | Martin et al. | 428/373 |
| 5,972,463 A | 10/1999 | Martin et al. | 428/95 |
| 5,987,867 A * | 11/1999 | Lang et al. | 57/236 |
| 6,080,482 A | 6/2000 | Martin et al. | 428/373 |
| 6,099,603 A | 8/2000 | Johnson | 51/297 |
| 6,159,576 A * | 12/2000 | Rockwell, Jr. | 428/95 |
| 6,305,431 B1 * | 10/2001 | Fenkes | 139/391 |
| 6,468,621 B1 * | 10/2002 | Landau | 428/89 |
| 6,468,622 B1 * | 10/2002 | Combs et al. | 428/92 |
| 2002/0086133 A1 * | 7/2002 | Morin et al. | 428/92 |
| 2002/0092261 A1 * | 7/2002 | Rockwell et al. | 52/745.05 |
| 2003/0021944 A1 * | 1/2003 | Morin et al. | 428/89 |
| 2005/0003139 A1 * | 1/2005 | Keller | 428/89 |

FOREIGN PATENT DOCUMENTS

| | | | |
|---|---|---|---|
| GB | 2279247 A | * | 1/1995 |
| JP | 09285438 A | * | 11/1997 |
| JP | 2000-279210 | | 10/2000 |

OTHER PUBLICATIONS

Japan Patent Office, Patent Abstracts of Japan—Publication No. 2000-279210, Loop Fastener Female Member, Toyobo Co. Ltd, Oct. 10, 2000.

US Patent & Trademark Office, PCT International Search Report for PCT/US 01/43936, Apr. 11, 2002.

U.S. Appl. No. 09/752,306, filed Dec. 29, 2000; (Our File No. 5133) entitled "Loop Textile".

* cited by examiner

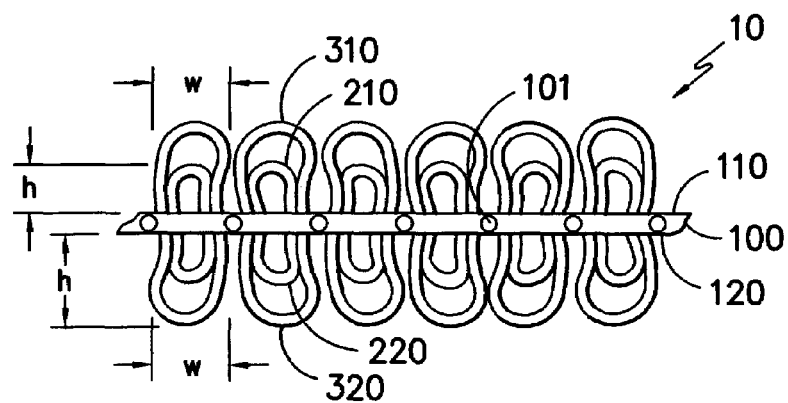
FIG. -1-
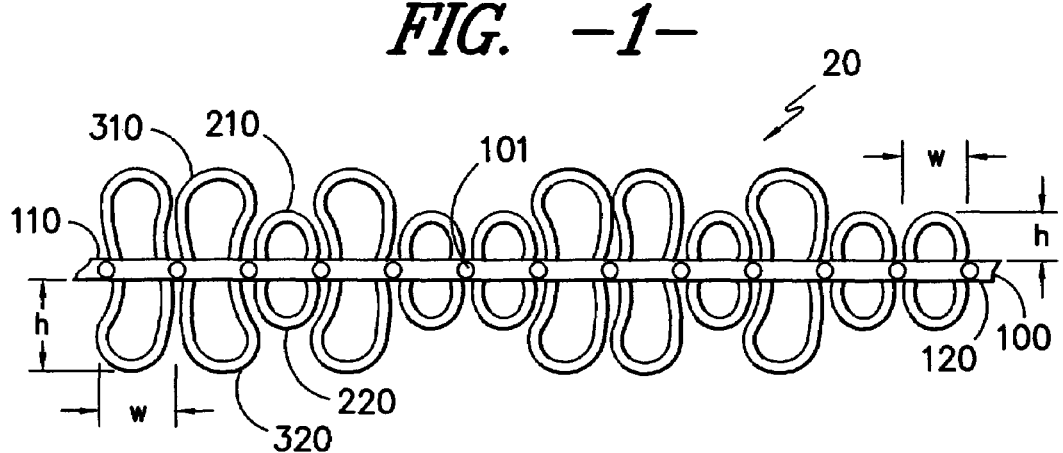
FIG. -2-
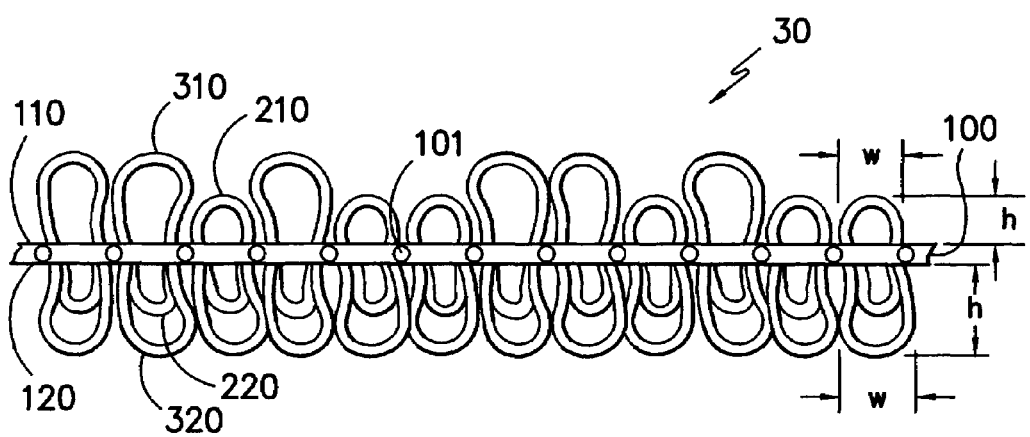
FIG. -3-

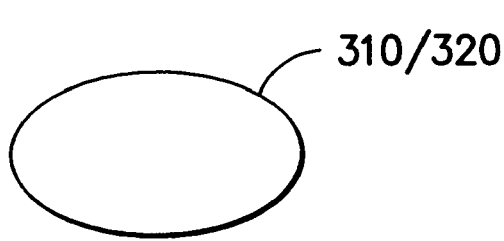
FIG. -4A-
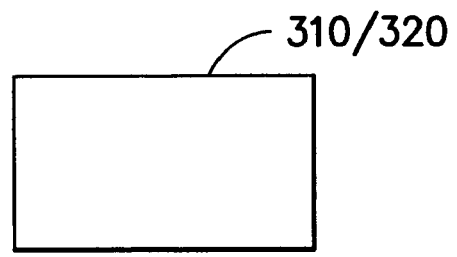
FIG. -4B-
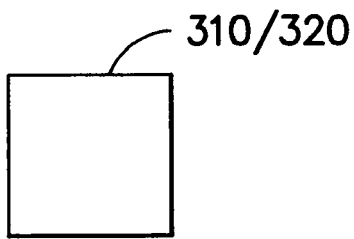
FIG. -4C-
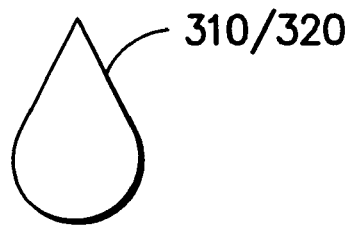
FIG. -4D-
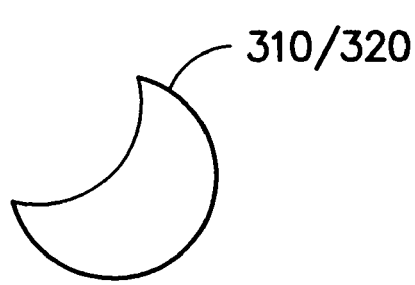
FIG. -4E-
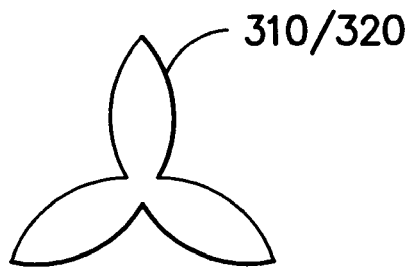
FIG. -4F-

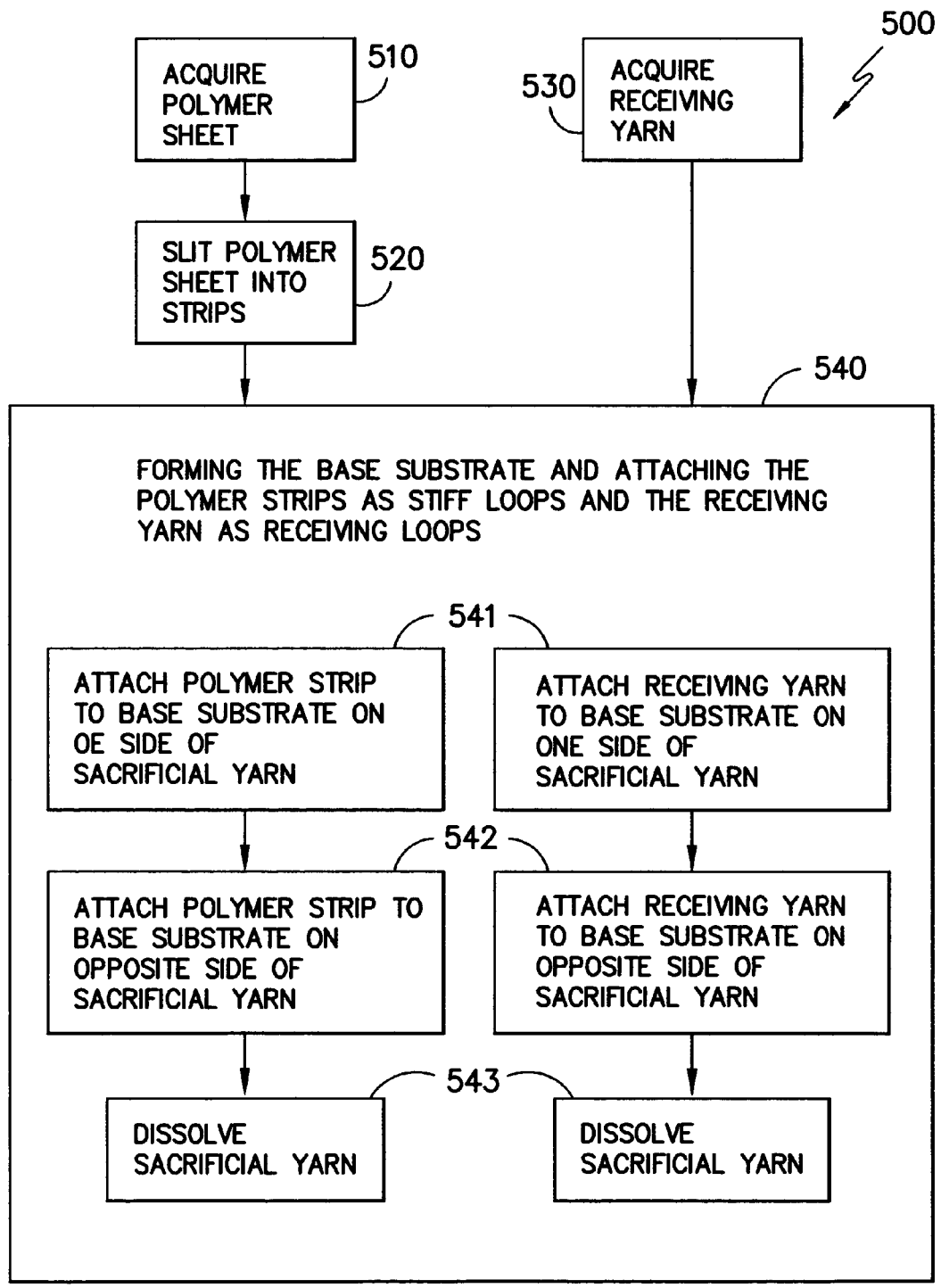
FIG. —5—

COMBINATION LOOP TEXTILE

CROSS-REFERENCE TO RELATED APPLICATIONS

This application is a Continuation of prior copending parent application Ser. No. 09/751,998 filed on Dec. 29, 2000 now abandoned.

BACKGROUND

The present invention generally relates to textiles having loops extending outwardly from a base material.

Loop textiles have many applications. As an example, terry cloth loop textiles have been used for cleaning purposes. However, the terry cloth loops do not always provide a surface sufficient for scrubbing a surface. Therefore, there is a need for loop textiles having different characteristics for engaging another item.

BRIEF DESCRIPTION OF THE DRAWINGS

FIG. 1 is a cross-sectional view of an embodiment of the present invention, illustrated as a loop textile.

FIG. 2 is a cross-sectional view of another embodiment of the present invention.

FIG. 3 is a cross-sectional view of yet another embodiment of the present invention.

FIG. 4A-F are enlarged cross-sectional views of a filament from a loop of the textile in FIGS. 1-3.

FIG. 5 is a block diagram illustrating one embodiment of a method for forming the loop textiles in FIGS. 1-3.

and 30, generally include a base substrate 100 with a first surface 110 and a second surface 120, a plurality of first and second receiving loops 210, 220 extending from the base substrate 100, and a plurality of first and second stiff loops 310, 320 extending from the base substrate 100.

As illustrated in FIGS. 1-3, the base substrate 100 is a knitted cloth formed from a plurality of substrate yarns 101. Although the base substrate 100 is illustrated in FIGS. 1-3 as a knitted cloth, the base substrate 100 can be any material that provides a flexible cloth-like base from which the loops 210, 220, 310, 320 can extend. For example, the base substrate can also be woven, non-woven, foam (open or closed cell), film, or any other similar web-like material. In one embodiment, the base substrate 100 is absorbent. In another embodiment, the base substrate 100 can receive particles.

The first receiving loops 210 are a yarn that originate and extend outwardly from the first surface 110 of the base substrate 100, and return into the first surface 110 of the base substrate 100. The second receiving loops 220 are a yarn that originate and extend outwardly from the second surface 120 of the base substrate 100, and return into the second surface 120 of the base substrate 100. In one embodiment, the height (h) of the receiving loop 210, 220 is between about 0.1 millimeter and about 5 millimeters, and the width (w) of the receiving loop 210, 220 is between about 0.1 millimeters and about 5 millimeters at the widest point. In another embodiment, the height (h) of the receiving loop 210, 220 is between about 0.3 millimeter and about 3 millimeters, and the width (w) of the receiving loop 210, 220 is between about 0.3 millimeters and about 3 millimeters at the widest point. In a particular embodiment, the receiving loop 210, 220 extends to a height (h) of about 0.8 millimeters from the base substrate 100, and is about 1.0 millimeter wide (w) at the widest point.

The receiving loops 210, 220 are absorbent and/or retain particles. In one embodiment, the yarn forming the first and second receiving loops 210, 220, is the same yarn as the substrate yarn 101 forming the base substrate 100. In another embodiment, the yarn forming the first and second receiving loops 210, 220, can be a different yarn than the substrate yarn 101 forming the base substrate 100. The yarn forming the receiving loops 210, 220 can be filament or staple yarns, textured or non-textured, and include an appropriate surface finish. The receiving loops 210, 220 have a denier per yarn of greater than about 10 in one embodiment, and greater than about 20 in another embodiment. The receiving loops 210, 220 also have a denier per yarn of less than about 1000 in one embodiment, and less than about 500 in another embodiment. In one embodiment, the receiving loops 210, 220 can have from 10 to 10,000 filaments per yarn, and at least one of the filaments can range from about 0.01 to about 5 denier per filament. In another embodiment, the receiving loops 210, 220 have at least one filament with a denier per filament of less than about 1.

The first stiff loops 310 are a yarn that originate and extend outwardly from the first surface 110 of the base substrate 100, and return into the first surface 110 of the base substrate 100. The second stiff loops 320 are a yarn that originate and extend outwardly from the second surface 120 of the base substrate 100, and return into the second surface 120 of the base substrate 100. The stiff loops 310, 320 have a height and width that is generally sufficient to receive material within the stiff loops 310, 320 when the textile 10, 20, 30 passes over another surface. In one embodiment, the height (h) of the stiff loop 310, 320 is between about 0.1 millimeter and about 5 millimeters, and the width (w) of the stiff loop 310, 320 is between about 0.1 millimeters and about 5 millimeters at the widest point. In another embodiment, the height (h) of the stiff loop 310, 320 is between about 0.3 millimeter and about 3 millimeters, and the width (w) of the stiff loop 310, 320 is between about 0.3 millimeters and about 3 millimeters at the widest point. In a particular embodiment, the stiff loop 310, 320 extends to a height (h) of about 1.0 millimeters from the base substrate 100, and is about 0.8 millimeter wide (w) at the widest point.

As illustrated in FIGS. 1-3, the stiff loops 310, 320 are a mono-filament yarn. However, it is contemplated that the yarn forming the stiff loops 310, 320 can be either a mono-filament yarn or a multiple filament yarn. In one embodiment, the yarn forming the stiff loops 310, 320 has at least one filament with a denier per filament of at least about 10. In another embodiment the yarn forming the stiff loops 310, 320 have at least one filament with a denier per filament of at least about 20. In one embodiment the yarn forming the stiff loops 310, 320 have a denier per yarn of no greater than about 500 in one embodiment, and about 1000 in another embodiment.

Referring now to FIG. 4A-F, there are shown enlarged cross-section of various embodiments of filaments that can be used in the yarn of the stiff loops 310, 320 from FIGS. 1-3. The cross-section of the filaments used in the yarn of the stiff loops 310, 320 can be circular, or as shown in FIGS. 4A-F, or another cross-section. In FIG. 4A is illustrated a filament having an elliptical cross-section. In FIG. 4B is illustrated a filament having a rectangular cross-section. In FIG. 4C is illustrated a filament having a square cross-section. In FIG. 4D is illustrated a filament having a tear drop shaped cross-section. In FIG. 4E is illustrated a filament having a crescent shaped cross-section. In FIG. 4F is illustrated a filament having a multi-lobe cross-section, such as a tri-lobe.

In one embodiment, the cross-section of the filament(s) forming the stiff loops 310, 320 have an aspect ratio of greater than 1.2, as illustrated in FIGS. 4A-F. As used herein an aspect ratio shall mean the width of the cross-section at its widest point divided by the width of the cross-section at its narrowest point. In another embodiment, the cross-section of the filament(s) forming the stiff loops 310, 320 have at least one corner edge, as illustrated in FIGS. 4B-F. In yet another embodiment, the cross-section of the filament(s) forming the stiff loops 310, 320 have a cross-section with at least a portion of the cross-section being concave, as illustrated in FIGS. 4E-F. As used herein, concave shall mean a shape that the outer perimeter extends within a straight line drawn between any two points on the outer perimeter.

In an embodiment where the stiff loops 310, 320 are formed of mono-filament yarns, the cross sections of the filaments can either be all one type of cross-section, or multiple cross-sections can be used for the filaments forming the various stiff loops 310, 320. In an embodiment where the loops are formed of multiple filament yarns, the cross sections of the filaments forming the yarns can either be all of one type of cross-section (homogeneous), or multiple types of cross-sections (heterogeneous). Additionally, the various stiff loops 310, 320 can be yarns of different filaments, including any combination of homogenous yarns and/or heterogeneous yarns. Furthermore, the various stiff loops 310, 320 can be combinations of any of the mono-filament yarns and multiple filament yarns.

Referring back now to FIGS. 1-3, the yarn forming the stiff loops 310, 320 can be stiffer than the material of the base substrate 110. The yarn forming the first and second stiff loops 310, 320 can also be stiffer than the material of the receiving loops 210, 220. In one embodiment, filaments forming the stiff loops 310, 320 are at least about a 10 denier per filament size larger than the filaments forming the receiving loops 210, 220.

The textile 10, 20, 30 having the two type of loops 210, 220, and 310, 320, can be imparted with favorable absorbency characteristics. Absorbency is defined by the mass of water absorbed by a textile per mass of textile. A common test procedure for this characteristic is the Institute of Environmental Science & Technology (IEST), Control Division Recommended Practice 004.2, test IEST-RP-CC004.2, "Evaluating Wiping Materials Used in Cleanrooms and Other Controlled Environments". In one embodiment, the textile 10, 20, 30 has an absorbency rate of at least about 2 grams of water per gram of textile. In another embodiment, the textile 10, 20, 30 has an absorbency rate of at least about 2.5 grams of water per gram of textile. In yet another embodiment, the textile 10, 20, 30 has an absorbency rate of at least about 3 grams of water per gram of textile.

Referring now to FIG. 1, the first receiving loops 210 and the first stiff loops 310 originate at about the same location in the first side 110 of the base substrate 100, and return to the first side 110 of the base substrate 100 at about the same location as each other. Similarly, the second receiving loops 220 and the second stiff loops 320 originate at about the same location in the second side 120 of the base substrate 100, and return at about the same location in the second side 120 of the base substrate 100 as each other. Although the loop textile 10 has been illustrated in FIG. 1 with receiving loops 210, 220 and stiff loops 310, 320 on both sides 110, 120 of the base substrate 100, it is contemplated that the present invention may have only receiving loops 210 and stiff loops 310 on the first side 110, receiving loops 210 and stiff loops 310 on the first side 110 with only receiving loops 220 on the second side 120, receiving loops 210 and stiff loops 310 on the first side 110 with only stiff loops 320 on the second side 120, or only receiving loops 210 on the first side 110 with only stiff loops 320 on the second side 120.

Referring now to FIG. 2, the first receiving loops 210 and the first stiff loops 310 originate in the first side 110 of the base substrate 100 and return into the first side 110 of the base substrate 100. The first receiving loops 210 can originate and return adjacent to each other, or adjacent to first stiff loops 310. Similarly, the first stiff loops 310 can originate and return adjacent to each other, or adjacent to first receiving loops 210. The second receiving loops 220 and the second stiff loops 320 originate in the second side 120 of the base substrate 100 and return to the second side 120 of the base substrate 100. The second receiving loops 220 can originate and return adjacent to each other, or adjacent to second stiff loops 320. Similarly, the second stiff loops 320 can originate and return adjacent to each other, or adjacent to second receiving loops 220. Although the loop textile 20 has been illustrated in FIG. 2 with receiving loops 210, 220 and stiff loops 310, 320 on both sides 110, 120 of the base substrate 100, it is contemplated that the present invention may have only receiving loops 210 and stiff loops 310 on the first side 110, receiving loops 210 and stiff loops 310 on the first side 110 with only receiving loops 220 on the second side 120, receiving loops 210 and stiff loops 310 on the first side 110 with only stiff loops 320 on the second side 120, or only receiving loops 210 on the first side 110 with only stiff loops 320 on the second side 120.

Referring now to FIG. 3, the first receiving loops 210 and the first stiff loops 310 originate in the first side 110 of the base substrate 100 and return into the first side 110 of the base substrate 100. The first receiving loops 210 can originate and return adjacent to each other, or adjacent to first stiff loops 310. Similarly, the first stiff loops 310 can originate and return adjacent to each other, or adjacent to first receiving loops 210. However, the second receiving loops 220 and the second stiff loops 320 originate at about the same location in the second side 120 of the base substrate 100, and return at about the same location in the second side 120 of the base substrate 100 as each other. Although the loop textile 30 has been illustrated in FIG. 3 with receiving loops 210, 220 and stiff loops 310, 320 on both sides 110, 120 of the base substrate 100, it is contemplated that the present invention may have only receiving loops 210 and stiff loops 310 on the first side 110, receiving loops 210 and stiff loops 310 on the first side 110 with only receiving loops 220 on the second side 120, receiving loops 210 and stiff loops 310 on the first side 110 with only stiff loops 320 on the second side 120, or only receiving loops 210 on the first side 110 with only stiff loops 320 on the second side 120.

Additionally, it is anticipated that the present invention can be a textile that has sections according to the textile 10 in FIG. 1 and sections according to the textile 20 in FIG. 2 on either side, or both sides, of the textile. Also, it is anticipated that the receiving loops 210, 220 can be smaller, larger, or the same size as the stiff loops 310, 320, in height and/or width.

Referring now to FIG. 5, there is shown a block diagram of a method 500 of forming one embodiment of the textile according to any one of FIGS. 1-3. The method 500 illustrated in FIG. 5 generally includes the steps of acquiring a sheet of polymer material 510, slitting the sheet of polymer material into strips 520, acquiring a receiving yarn 530, and forming a base substrate and attaching the strips of polymer to the base substrate as stiff loops extending from the base substrate and attaching the receiving yarn to the base substrate as receiving loops extending from the base substrate 540.

In step 510, the acquired sheet of polymer material can be a polymer that is extruded, cast, blown, or that is formed in any other manner that produces a sheet of polymer. The polymer can be polyethylene, polyester, polypropylene, or the like. The thickness of the sheet can be from about 0.0005 inches to about 0.005 inches. In one embodiment, the film is about 0.0015 inches thick.

In step 520, the sheet of polymer material is slit into individual filaments. In one embodiment, a long sheet of polymer material is unrolled and engages a row of knives that slit the sheet of polymer from its original width to many strips of the polymer material, the number of strips determined by the number of knives. The width of the filaments can be from about 0.002 inches to about 0.25 inches. In one embodiment, the individual filaments are strips of polymer that are about 0.0145 inches wide.

In step 540, the forming a base substrate and attaching the strips of polymer and receiving yarn can be performed by double knitting the base substrate, tucking the strips of polymer and receiving yarn into the base substrate, and knitting the polymer strips and receiving yarn into the base substrate as loops. In one embodiment, the polymer strips and receiving yarn are attached as loops to the base substrate by attaching a first section of the strip of polymer and the receiving yarn to the base substrate 541, bringing the strip of polymer and receiving yarn around sacrificial yarn, attaching a second section of the strip of polymer and receiving yarn to the base substrate on the opposite side of the sacrificial yarn from the first section of the strip of polymer and receiving yarn 542, and removing the sacrificial yarn from between the base substrate and the strip of polymer and receiving yarn to form a stiff loop of the strip of polymer and a receiving loop of the receiving yarn 543. In a further embodiment, the step of removing the sacrificial yarn is performed by dissolving the sacrificial yarn.

The present invention can also be better understood by reference to the following example. A polymer sheet was acquired of a polyester film being about 0.0015 inches thick. The polymer sheet was slit into filament strips of about 0.0145 inches wide. A base substrate was formed from a substrate yarn of textured filament polyester yarn, having 34 filaments per yarn at a yarn denier of 150 (such as Dacron 56T by DuPont). The filament polymer strips were attached to the base substrate as stiff loops by tucking the filament polymer strips into a first side of the base substrate as it was being formed, and knitting the filament polymer strips into the base substrate around a one ply, 40 denier per filament, 12 filament sacrificial water-soluble poly(vinyl alcohol) yarn (such as Solvron by Nitivy) on the first side of the base substrate. A soft yarn of splittable of Nylon/PET, 150 denier per yarn, 48 filament (splittable into 48×11=528 filaments) (such as Wramp by Kuraray), was attached to the base substrate as receiving loops by tucking the soft yarn into a second side of the base substrate as it was being formed, and knitting the soft yarn into the base substrate around a one ply, 40 denier per filament, 12 filament sacrificial water-soluble poly(vinyl alcohol) yarn (such as Solvron by Nitivy) on the second side of the base substrate. The sacrificial yarn was removed by immersing the textile into a hot water scour of 160 F. After formation of the loops by dissolving the sacrificial yarn, the textile was dyed, slit to proper width, dried, and cut to the appropriate size. The textile according to this first example had an absorbency of about 3 grams of water per gram of textile.

In a second example, the first example was formed with an additional soft yarn being attached and knitted into the base substrate as receiving loops on the same side of the base substrate as the stiff loops. The textile according to this second example had an absorbency of about 4 grams of water per gram of textile.

What is claimed is:

1. An article comprising:
   a base substrate having a first side and a second side;
   a plurality of receiving loop yarns extending from the first side of said base substrate, the receiving loop yarns comprising a multi-filament yarn; and,
   a plurality of stiff loop yarns extending from the first side of said base substrate, each of said plurality of stiff loop yarns comprising a monofilament yarn having a denier per filament of at least about 10 denier per filament greater than the multi-filament yarns of the receiving loop yarns, wherein the stiff loop yarns are stiffer than the receiving loop yarns, and;
   wherein the receiving loop yarns and the stiff loop yarns originate at the same origination location on the first side of the base substrate and return to the first side of the base substrate at the same return location to form first receiving loops and first stiff loops, wherein the origination location and the return location for each first receiving and first stiff loop are separated by about 0.1 to 5 millimeters along the base substrate, and wherein the first stiff loops are higher than and separate from the first receiving loops.

2. The article according to claim 1, wherein the stiff loop yarns include a cross-section having at least one corner edge.

3. The article according to claim 1, wherein the stiff loop yarns include a cross-section having an aspect ratio of greater than 1:2.

4. The article according to claim 1, wherein the stiff loop yarns comprise a slit film.

5. The article according to claim 1, wherein the stiff loop yarns have a cross-sectional area that is selected form the group consisting of square shaped, rectangular shaped, tear drop shaped, crescent shaped, multi-lobe shaped, and concave shaped.

6. The article according to claim 1, further comprising:
   a base substrate having a first side and a second side;
   a plurality of second receiving loop yarns extending from the second side of said base substrate, the second receiving loop yarns comprising a multi-filament yarn;
   a plurality of second stiff loop yarns extending from the second side of said base substrate, each of said plurality of second stiff loop yarns comprising a monofilament yarn having a denier per filament of at least about 10 denier per filament greater than the multi-filament yarns of the second receiving loop yarns, wherein the second stiff loop yarns are stiffer than the second receiving loop yarns;
   wherein the second receiving loop yarns originate an origination location on the second side of the base substrate and return to the second side of the base substrate at a return location on the second side of the base substrate, wherein the second stiff loops originate an origination location on the second side of the base substrate and return to the second side of the base substrate at a return location on the second side of the base substrate, and wherein the second stiff loops are higher than and separate from the second receiving loops.

7. The article according to claim 6, wherein the second receiving loop yarns and the second stiff loop yarns originate at the same origination location on the second side of the base substrate and return to the second side of the base substrate at the same return location, and wherein the origination location and the return location are separated by about 0.1 to 5 millimeters along the base substrate.

8. The article according to claim 7, wherein the origination locations on the first side of the base substrate and the origination locations on the second side of the base substrate are located at the same points along the base substrate, and wherein the return locations on the first side of the base substrate and the return locations on the second side of the base substrate are located at the same points along the base substrate.

* * * * *

UNITED STATES PATENT AND TRADEMARK OFFICE
CERTIFICATE OF CORRECTION

PATENT NO. : 7,273,648 B2 Page 1 of 1
APPLICATION NO. : 10/714994
DATED : September 25, 2007
INVENTOR(S) : Morin et al.

It is certified that error appears in the above-identified patent and that said Letters Patent is hereby corrected as shown below:

In column 6, Line 34, delete the " ; " and replace with -- . -- .

Signed and Sealed this

Fourth Day of December, 2007

JON W. DUDAS
*Director of the United States Patent and Trademark Office*